Patented Aug. 28, 1951

2,566,206

UNITED STATES PATENT OFFICE 2,566,206

COPOLYMERIZATION CATALYZED BY MIXTURE OF PERACETIC ACID AND ANOTHER ORGANIC PEROXIDE

Joseph B. Hyman, Scotch Plains, N. J., assignor to Catalin Corporation of America, a corporation of Delaware No Drawing. Application May 21, 1948, Serial No. 28,523

3 Claims. (Cl. 260—45.4)

This invention relates to a catalyst composition and the method of polymerizing unsaturated materials with the use of the composition.

The invention is particularly useful in making thermoset copolymers of (1) esters of unsaturated acids with polyhydric alcohols and (2) double bond polymerizable monomers.

The invention will be illustrated, therefore, by description first in connection with making such copolymers, particularly of styrene with the maleate of a glycol such as diethylene glycol.

Copolymerizing the glycol maleates with styrene is practiced widely and successfully. Organic peroxides are used as catalysts. When this reaction is employed, however, in making cast polymerized resinous products, difficulties are encountered. In making a large cast product, with a proportion of the catalyst that is not so large as to be seriously objectionable, from the standpoints of initial cost and also contamination of the product by the large amount of catalyst, dissipation of the heat which develops during the polymerization is not satisfactory. Also there is an objectionably long time required for the initial stages of the reaction involving the formation first of a gel, the gel then gradually hardening to the final cured product. The long time required for the formation of the gel is particularly objectionable when there is to be incorporated some foreign material that must remain either at the surface or suspended in the product. In making mottled goods, suspending gold flitter in the resin, or applying pearl essence over the surface of a cast sheet, it is necessary that the thickening up of the mass occur before the added materials sink. The slow rate of gelling is aggravated because of the need of effecting the gelling at room temperatures, so that the worker may have access to the mass for proper mottling or suspension of the foreign materials.

When it has been attempted so to speed up the copolymerization by the addition of larger amounts of the conventional organic peroxide catalysts, two difficulties have arisen. In the first place, the period for the thickening up to the gel stage, at which the suspended matter does not settle, often requires still many hours. In the second place, after the gelation does occur, a spontaneous exotherm does not develop at room temperatures; when heat is then applied to the gelled mass, for curing, the reaction becomes rapid and the exotherm so extreme that the cast and cured product contains cracks or bubbles or both and is generally unsatisfactory.

With my new method, the catalyst composition speeds up the reaction at room temperatures to the thickened stage, at which undissolved material remains suspended, and then, with no further addition, rapid resin gelation occurs. Shortly after gelation and still with no application of external heat, a spontaneous reaction exotherm develops in a manner which permits easy dissipation. The exotherm is easily controlled even though the total time of cure is greatly shortened. Then by a short heat curing cycle, I obtain a clear product free from cracks and bubbles. Naturally the higher the temperature the more rapid the gelation, but my catalyst composition offers the advantages needed in the room temperature range, as, for instance, 20° to 30° C. and avoids the difficulties often encountered when the gelation is induced by external heat.

Briefly stated, the invention is the catalyst composition comprising the combination of an organic peroxide catalyst of double bond polymerization and a small and limited proportion of peracetic acid.

The invention comprises also the method of copolymerizing the unsaturated polyester and styrene types of materials which includes forming a mixture of the materials with my catalyst composition and maintaining the mixture at approximately room temperature until there is formed a gel that, in susceptibility to bending and stretching, is somewhat rubbery and finishing at elevated temperatures not above 110° C.

Peracetic acid and the organic peroxides have been used separately in making polymers.

With the classes of materials represented, on the one hand, by diethylene glycol maleate (polyesters) and, on the other, by styrene (double bond polymerizable monomers), peracetic acid has heretofore been unsatisfactory. When used in proportion necessary to copolymerization in a practical time cycle, it causes the copolymerization to proceed so violently as to be uncontrollable and to give crazed, bubbled and entirely unsatisfactory material. Furthermore, the cast products crack on aging.

The peroxide catalysts, with the same classes of materials to be copolymerized, are unsatisfactory, not only in the long time required for the initial thickening up and subsequent gel formation at room temperatures, but also in the uncontrollability of the reaction once the exotherm is initiated by the application of heat for final cure.

I have now found that a mixture of the organic peroxide with a minor proportion of the peracetic acid avoids these objections. The presence of peracetic acid in my catalyst composition does not affect the stability of the peroxide.

For these results it is necessary that the proportion of the peracetic acid be within certain limits. The proportion of peracetic acid must be not above 15 parts or below 2.5 parts for 100 parts of the total weight of the peroxide and peracetic acid catalyst composition. If less than 2.5 parts is used, the amount is insufficient to produce at room temperatures the desired rapid thickening and gelation followed by the controllable spontaneous exotherm release. If more than 15 parts are used, the undesirable properties of peracetic acid per se become evident in the finished product.

Proportions here and elsewhere herein, unless otherwise stated to the contrary, are expressed as parts by weight.

The proportion of the total catalyst composition to be used is 0.03 to 1 part for 100 parts of the materials to be copolymerized. With the polyester and styrene types of monomers, the best results are obtained when the proportion is 0.1 to 0.3 part. Ordinarily, the larger the casting, the less the proportion of catalyst required.

As the organic peroxide catalyst I select one of those that is known to be a catalyst of copolymerization of a vinylidene monomer and a linear ester of maleic and like unsaturated dibasic acid. Examples of these organic peroxides are tertiary butyl hydroperoxide, benzoyl peroxide, acetyl peroxide, lauryl peroxide, and stearyl peroxide.

The peroxides used and also the peracetic acid are incorporated in the mix in their commercial forms which, with the peroxide solutions, range from 30 to 60% of the active material. The remainder is some material that is inert in the reaction. I have used to advantage a commercial product consisting of Tertiary butyl hydroperoxide (60% solution).
Acetyl peroxide (30% solution in dimethyl phthalate).
Benzoyl, lauryl and stearyl peroxides (100% powder).
Peracetic acid (40% solution containing also 39% $CH_3COOH$, 5% $H_2O_2$, 1% $H_2SO_4$ and 13% $H_2O$).

As presently used in polymerizations, the solution medium of the commercial forms of the liquid peroxides and peracetic acid are inactive or inert in the reaction and do not affect resin properties. In the proportions stated herein, those so-called inert materials are omitted, the weights given being the weights of the organic peroxide and peracetic acid on the 100% basis.

I have found no substitute for peracetic acid in my catalyst composition. Other materials that should have been expected to give a similar result do not give the desired quick gelling followed by moderation after the gel stage is reached. Ineffective is the addition of mineral or organic acids, e. g. $H_2SO_4$, HCl, or $CH_3COOH$, to say, acetyl peroxide or tertiary butyl hydroperoxide, to establish the pH at the level which obtains in my peracetic acid and peroxide composition. Also the initiation effect is not proportional to the active oxygen content, since catalysts with much more higher oxygen content than present in my composition proved less reactive in the copolymerization. It is considered that the peracetic acid has a powerful specific reaction-initiating effect upon the double bonds in the ester and monomeric unsaturate, during both the initial resin gelation and final cross linking.

As the polyhydric alcohol ester of the unsaturated acid, constituting one of the materials to be copolymerized, I use the maleates of ethylene glycol, propylene glycol, diethylene glycol, or other alcohol. Such other alcohol may be used provided it is of the class known to give high molecular weight linear esters with unsaturated dibasic acids. Also I may use the esters of any one of these polyhydric alcohols with fumaric acid or dimethyl maleic acid. Likewise I may use mixed fumarate and maleate esters, fumarate and phthalate, or maleate and phthalate esters of the selected polyhydric alcohol. A part at least of the acid should be unsaturated.

In place of styrene as the monomer to be polymerized with the polyester I may use vinyl acetate, methyl methacrylate, and like double bond polymerizable monomer.

When the two classes of materials to be polymerized are shipped together to the user, it is customary to incorporate in the mixture an inhibitor of polymerization such as hydroquinone, to avoid polymerization of the monomers during storage before use. Another effect of the inhibitor has been to retard greatly the polymerization when the organic peroxide catalyst is added and polymerization is desired. I find that my catalyst composition, including the organic peroxide with a small proportion of peracetic acid, overcomes the effect of the inhibitor so that copolymerization is rapid even without any special precautions to remove or destroy the inhibitor.

In general, the method of making the cast copolymerized products consists in mixing monomers of the two classes described with a small proportion of the catalyst composition and then subjecting the resulting mixture to conditions that are conventional in casting copolymer type resins, except as details of the method are stated herein.

The invention will be illustrated more specifically in connection with the following specific examples. These describe the method suitable for making large castings.

Proportions here and elsewhere herein, are expressed as parts by weight unless specifically stated to the contrary.

*Example 1*

Diethylene glycol maleate having an acid number of 36.4 was prepared in an inert atmosphere at 200° C. using 1.03 mols of the glycol for each mol of maleic anhydride. 0.005% by weight of hydroquinone was added to the charge prior to the esterification, for good shelf life.

68 parts of the glycol maleate was then mixed with 32 parts of styrene monomer, to form the copolymerizable monomer.

2.5 parts of catalyst composition consisting of 90.7% by weight of acetyl peroxide and 9.3% peracetic acid were mixed with 500 parts of the copolymerizable monomer. After the mixture was stirred and made uniform it was kept at room temperature (25° C.). After 35 minutes, gelation occurred. Approximately one-half hour later a spontaneous exotherm developed, but the heat generated was easily dissipated. Complete cure was then effected by maintaining the mixture at 50° C. overnight and then at 75° C. for two hours. The result was a good clear casting, free of cracks and bubbles, with a Rockwell Hardness value of +72 on the H scale (20° C.).

If desired, the curing time cycle can be shortened. For example, excellent results were also obtained by curing 2 hours at 50° C. and then at 85° C. for 2 hours.

By contrast with this example, there was made a similar run in which the only catalyst used was peracetic acid in the proportion of 0.5 part to 500 parts of the copolymerizable monomer. Gelation occurred within 12 minutes when the mixture was kept at room temperature. However, the gelation was accompanied by a violent exothermic reaction which resulted in a cracked and bubbled mass. When another run was made and the proportion of peracetic acid as the sole catalyst was reduced to one-half of that used previously, namely 0.25 part, gelation occurred in 15 minutes at room temperature and the finished product was bubbled and badly cracked. Even further reduction of the peracetic acid failed to yield a satisfactory product. To avoid the violent reaction it was necessary to reduce the amount to such an extent that it was insufficient to yield a cured casting after many days of oven treatment.

The necessity of keeping the peracetic acid, within the prescribed limits of my invention, is demonstrated as follows:

2.5 parts of catalyst composition consisting of 98.7% of acetyl peroxide by weight and 1.3% of peracetic acid was mixed with 500 parts of the copolymerizable monomers of kind and in proportion to each other as described in Example 1. When the mixture was kept at room temperature, 6 hours were required for gelling of the mass. No spontaneous exotherm followed after gelation occurred. However, when heat was applied for curing (50° C.) a strong exotherm developed and the casting cracked badly.

*Example 2*

For contrast with my invention, 10 parts by weight of tertiary butyl hydroperoxide alone were mixed with 500 parts of the copolymerizable monomers as described in Example 1. After remaining at room temperature for six hours, the mixture was still fluid and no signs of gelation were evident.

The above was repeated using instead 10 parts of a catalyst composition consisting of 93.4% by weight of tertiary butyl hydroperoxide and 6.6% peracetic acid. This was mixed with 500 parts of the copolymerizable monomers and the mass then kept at room temperature. Gelation occurred after 40 minutes. Approximately ½ hour later an exotherm developed spontaneously and this was easily dissipated. Curing was carried out as in Example 1 and a good clear uniform product was obtained free of defects.

*Example 3*

Diethylene glycol maleate having an acid number of 59.0 was prepared using equimolecular proportions of the glycol and maleic anhydride. 70 parts of the diethylene glycol maleate was then mixed with 30 parts of styrene monomer, to form the copolymerizable monomer mixture.

0.25 part of catalyst composition consisting of 90.7% by weight of acetyl peroxide and 9.3% peracetic acid were mixed with 500 parts monomers. Room temperature gelation occurred after one and one-half hours.

When this same catalyst composition addition was increased to 2.5 parts, the gelation time was decreased to 30 minutes. Exotherm dissipation and heat curing was then effected as in Example 1. Excellent cured castings were produced in both cases.

*Example 4*

17 mols of maleic anhydride, 1.36 mols of phthalic anhydride and 18.96 mols of diethylene glycol were used to prepare a diethylene glycol maleate phthalate resin with an acid number of 35. 68 parts of this resin was mixed with 32 parts of styrene to form the mixture of copolymerizable monomer.

5 parts of catalyst composition consisting of 90.7% by weight of acetyl peroxide and 9.3% peracetic acid were mixed with 500 parts of the copolymerizable monomer. The mass gelled after being kept at room temperature for 60 minutes. Approximately one hour later a spontaneous exotherm occurred which was easily dissipated. Heat curing produced a good casting with a Rockwell Hardness value of +48 on the H scale (20° C.).

The cast products made with my catalyst composition, as in the above examples, have remained clear and free of cracks or discoloration after one year of aging.

Products of the present invention are useful not only as cast plastics, but also as laminated articles. My catalyst composition can be readily applied with polyester copolymer resins used in the lamination of paper, cloth or glass materials. Its application with the low pressure laminating technique is particularly advantageous. The material is impregnated at room temperatures with the polyester copolymer monomer which contains my catalyst composition. By controlling the quantity of catalyst used, room temperature gelation can be made to occur within the desired time period. No heat is required either to produce gelation or to remove any volatile material from the polyester copolymer resin. In the laminating operations, the impregnated materials are subjected to short heat cycles at either high or low pressures depending upon the particular application.

It will be understood that it is intended to cover all changes and modifications of the examples of the invention herein chosen for the purpose of illustration which do not constitute departures from the spirit and scope of the invention.

What I claim is:

1. The method of making cast copolymers of a linear glycol ester of an acid selected from the group consisting of maleic and fumaric acids and a monomer selected from the group consisting of styrene, vinyl acetate and methyl methacrylate, the method comprising forming a mixture of the said ester and monomer to be copolymerized with a catalyst composition consisting of peracetic acid and an organic peroxide selected from the group consisting of carboxylic anhydride peroxides and tertiarybutyl hydroperoxide in the proportion of 2.5 to 15 parts by weight of the peracetic acid for 100 parts of total weight of the peroxide and peracetic acid, in the proportion of 0.03 to 1 part of the catalyst composition for 100 parts of the said ester and monomer, casting the resulting mixture, subjecting the cast material to approximately room temperature until the spontaneous exothermic reaction is substantially completed, the heat of the reaction is dissipated, and a gel is formed, and then subjecting the gelled product to an elevated temperature to cause the final curing of the composition.

2. The method described in claim 1, the ester and monomer used being diethylene glycol maleate and styrene, respectively, and the final curing being effected at an elevated temperature not above 110° C.

3. The method described in claim 1, the monomer used being styrene and the final curing being effected at an elevated temperature not above 110° C.

JOSEPH B. HYMAN.

REFERENCES CITED

The following references are of record in the file of this patent:

UNITED STATES PATENTS

| Number | Name | Date |
|---|---|---|
| 717,016 | Page | Dec. 30, 1902 |
| 2,340,109 | D'Alelio | Jan. 25, 1944 |
| 2,377,753 | Brubaker | June 5, 1945 |
| 2,462,042 | Howald et al. | Feb. 15, 1949 |
| 2,475,731 | Weith | July 12, 1949 |

OTHER REFERENCES

D'Ans.Z. fur Anorg. Chem. 73 (1912) pp. 355–357.

Boeseken et al., page 528–530 Rec. Trav. Chim. vol. 58 (1939).

Weeks Modern Plastics, Aug. 1948, pp. 103–107 and 110.